United States Patent
Arar et al.

[19]

[11] Patent Number: 6,027,304

[45] Date of Patent: Feb. 22, 2000

[54] HIGH PRESSURE INLET BLEED HEAT SYSTEM FOR THE COMPRESSOR OF A TURBINE

[75] Inventors: Malath Ibrahim Arar, Clifton Park; Timothy Robert Kemp, Greenfield Center; George Raymond Hubschmitt, Ballston Lake; David Anthony DeAngelis, Voorheesville; James Giles Eignor, Scotia, all of N.Y.

[73] Assignee: General Electric Co., Schenectady, N.Y.

[21] Appl. No.: 09/085,910

[22] Filed: May 27, 1998

[51] Int. Cl.$^7$ ........................................ F04D 3/00
[52] U.S. Cl. .................... 415/116; 415/119; 415/135; 415/136; 415/176; 415/58.5
[58] Field of Search .................... 415/116, 119, 415/134, 135, 136, 144, 145, 176–178, 58.5, 58.7; 138/37, 39

[56] References Cited

U.S. PATENT DOCUMENTS 4,328,666  5/1982  Cummins, Jr. ..................... 60/39.09 D
5,491,308  2/1996  Napier et al. ........................ 181/224
5,560,195  10/1996  Anderson et al. ..................... 60/39.07

*Primary Examiner*—Edward K. Look
*Assistant Examiner*—Ninh Nguyen
*Attorney, Agent, or Firm*—Nixon & Vanderhye

[57] ABSTRACT

The high pressure inlet bleed heat system includes a plurality of tubes which receive heated compressed air from the compressor extraction discharge manifold. The tubes extend into the inlet duct of the compressor, are uniformly spaced one from the other and have a uniform distribution of laterally opening apertures along their lengths in registration with the apertures of next laterally adjacent tubes. The tubes are located downstream of the silencer baffles. By providing choked flow through the apertures and lateral registration of the apertures of adjacent tubes, complete mixing of the heated air with the inlet air vortices behind the silencer baffles is achieved, affording a uniform temperature distribution across the inlet duct with minimum pressure loss. The tubes are constructed to accommodate thermal expansion of the manifold receiving compressor discharge air, the manifold also being supported to accommodate thermal expansion and contraction.

19 Claims, 7 Drawing Sheets

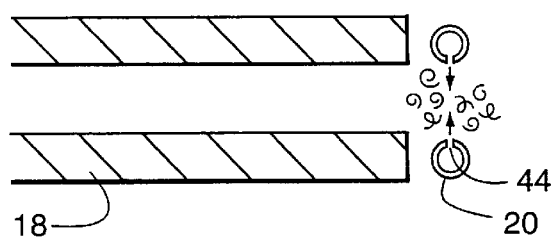
Fig. 5
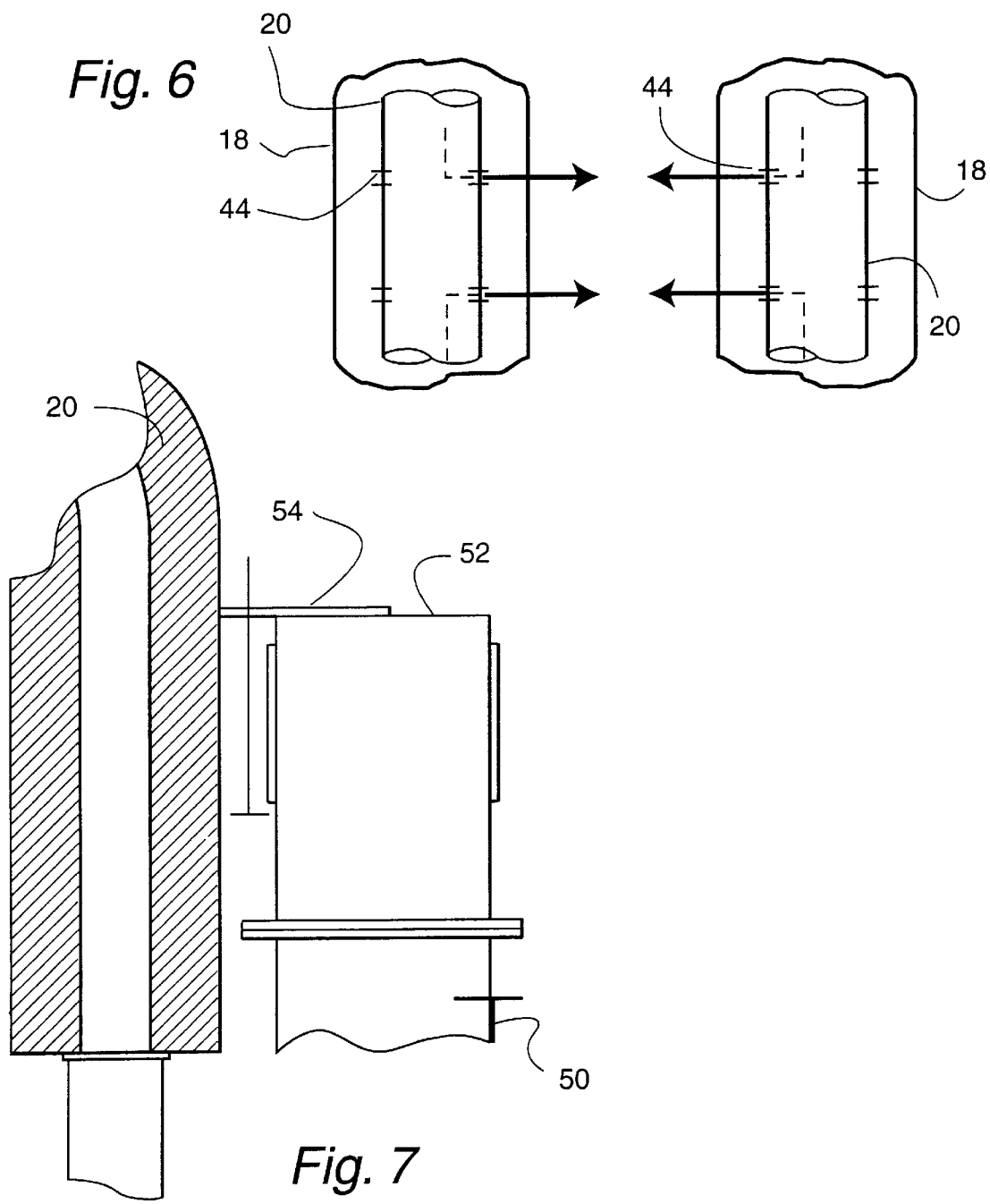
Fig. 6
Fig. 7

HIGH PRESSURE INLET BLEED HEAT SYSTEM FOR THE COMPRESSOR OF A TURBINE

TECHNICAL FIELD

The present invention relates to a high pressure inlet bleed heat system for heating inlet air supplied to the compressor and particularly relates to a system which ensures a uniform temperature profile across the compressor inlet, and affords low inlet air pressure loss and improvements in the structural integrity of the system components.

BACKGROUND

Air inlet systems for the compressors of turbines often include heating devices for raising the temperature of the air drawn into the compressor, as well as devices to attenuate noise. Heating tubes have been installed in the air inlet ducts of compressors to supply high temperature air extracted from the compressor for mixing with the ambient inlet air, thereby raising the temperature of the air supplied to the compressor. Baffles have also been employed in compressor air inlet ducts to reduce the noise generated by the air flowing through the inlet ducts to the compressor.

A prior system using compressor extraction air to heat the inlet air to the compressor employed a series of generally triangularly-shaped tubes disposed downstream of the silencer baffles in the compressor air inlet duct with each tube having an open apex facing in the upstream direction. Heated air extracted from the compressor flowed through a control valve choked to convert the high pressure air to low pressure air for supplying the low pressure heated air to the tubes. This heated air supply system included large piping, e.g., a large manifold disposed in the inlet air stream in the compressor inlet duct to conduct the heated low pressure air to the tubes. The low pressure heated air was supplied to the ambient air flowing in the compressor inlet duct through open apices of the tubes, which apices faced in an upstream direction. The heated air blown upstream was immediately turned downstream for flow back across the tubes. The reversed heated air and the inlet air formed vortices off the back edges of the tubes which aided in mixing the heated air and the ambient inlet air.

However, it was found that the temperature distribution of the air flowing to the compressor in that system was not uniform across the inlet duct. Icing on the inlet duct and compressor inlet remained a problem, particularly when operating at reduced inlet guide vane angles required to extend the range of dry low $NO_x$ premixed operation. Also, substantial pressure loss occurred because of the large ducting required in the air flow stream to supply the heated low pressure air to the inlet air stream. More specifically, this prior system oriented the multiple triangularly-shaped tubes in a direction generally perpendicular to the planes of the silencer baffles and which arrangement contributed to the lack of uniform temperature distribution across the inlet air duct. It will be appreciated that high inlet temperature distribution reduces turbine efficiency, reduces compressor pressure ratio operating margin and may physically damage compressor parts. Also, it was found, in such prior low pressure system, that the heated air supplied to the tubes generally did not have a uniform temperature distribution along the length of the tubes. Consequently, it has been determined that an improved inlet bleed heat system is necessary to reduce the pressure loss across the inlet, prevent ice build-up on the inlet ducting and compressor inlet, provide a uniform compressor inlet temperature profile, and to protect the turbine compressor from icing when operated at reduced inlet guide vane angles required to extend the range of operation in the dry low $No_x$ premixed mode.

DISCLOSURE OF THE INVENTION

According to the present invention, there is provided a high pressure inlet bleed system which, will ensure a uniform temperature profile across the compressor inlet without substantial pressure loss, as well as a system which will be robust and afford structural integrity. To accomplish this in accordance with the present invention, a high pressure inlet bleed heat system is provided which includes a manifold external to the inlet duct for receiving heated air extracted from the compressor. The manifold supplies heated air to a series of cylindrical tubes disposed in a uniform array thereof in the inlet duct behind and in the plane of upstream silencer baffles. The tubes have lateral apertures at spaced locations along the tubes and which apertures lie in lateral registration one with the other. The apertures are designed for choke flow and for directing the flow at the opposite registering aperture. The tubes are located directly behind the baffles and have an outer diameter slightly less than the thickness of the baffles. As the inlet air expands downstream of the baffles, it creates vortices from the trailing edges of the baffles. By providing lateral choked flow through the apertures directed toward one another, the heated air is thoroughly mixed with the cooler ambient inlet air in the vortices downstream of the tubes. A sufficient length of the inlet duct is provided downstream of the tubes for completing the mixing of the heated air and the ambient inlet air to produce a uniform temperature distribution across the duct leading to the compressor.

It will be appreciated that the heated air extracted from the compressor causes thermal expansion of the various parts of the inlet bleed heat system, for example, the manifold and tubes. The manifold comprises an elongated header externally of the inlet duct. To accommodate thermal expansion, the header is structurally mounted at a central location therealong. A pair of rods are provided at opposite ends of the header to support the header while permitting lengthwise thermal expansion and contraction of the opposite supported ends of the header. Additionally, the connecting portions of the tubes between the inlet duct and the header constitute tube runs which have a series of bends external of the inlet duct. These tube runs and bends provide sufficient flexibility to permit the header to thermally expand without exceeding allowable stress limitations of the tubes. Still further, the juncture of the tubes at the inlet duct wall permits axial movement of the tubes while restraining lateral movement. Thus, the system has built-in flexibility to accommodate thermal expansion and contraction.

In a preferred embodiment according to the present invention, there is provided an inlet bleed heat system for the compressor of a turbine, comprising an air inlet duct for delivering ambient air along a flow path to the compressor, a plurality of tubes, generally parallel to one another in the flow path of the air inlet duct and distributed substantially uniformly in the inlet duct, the tubes adapted for receiving heated extraction air from the compressor, each tube including a plurality of apertures spaced from one another along opposite sides of the tube for discharging the heated air from the tubes into the flow path, the apertures being arranged along next-adjacent tubes for discharging the heated air in directions toward one another to promote mixing of the discharged heated air with the ambient inlet air passing between the tubes to supply air to the compressor having a substantially uniform temperature distribution across the duct.

In a further preferred embodiment according to the present invention, there is provided an inlet bleed heat system for the compressor of a turbine, comprising an air inlet duct for delivering air along a flow path to the compressor, a plurality of tubes, generally parallel to one another in the flow path of the air inlet duct and distributed substantially uniformly in the inlet duct, a header external to the flow path, the header adapted for receiving heated extraction air from the compressor, the tube being connected to the header, each tube including a plurality of apertures spaced from one another along the tube for flowing the heated air from the tubes into the flow path for mixing with the inlet air passing between the tubes thereby affording a substantially uniform temperature distribution of air supplied to the compressor, the tubes being connected to the header and the inlet duct and constrained from movement within the inlet duct in directions substantially normal to the axes of the tubes while accommodating axial expansion and contraction of the tubes within the inlet duct responsive to the flow of heated air through the tubes.

In a still further preferred embodiment according to the present invention, there is provided an inlet bleed heat system for the compressor of a turbine, comprising an air inlet duct for delivering air along a flow path to the compressor, a plurality of tubes, generally parallel to one another in the flow path of the air inlet duct and distributed substantially uniformly to the inlet duct, an elongated header for receiving heated extraction air from the compressor, the tubes being connected to the header for flowing the heated air from the header into the tubes, each tube including a plurality of apertures spaced from one another along the tube for flowing the heated air from the tubes into the flow path for mixing with the inlet air passing between the tubes thereby affording a substantially uniform temperature distribution of air supplied to the compressor, the header being substantially rigidly carried by support structure connected to the header along an intermediate portion thereof enabling thermal expansion and contraction of opposite ends of the header relative to the intermediate header portion, and supports at opposite ends of the header for supporting the header at opposite ends without imposing substantial lateral restraint on the header.

Accordingly, it is a primary object of the present invention to provide a novel and improved high pressure inlet bleed heat system for the inlet duct of a compressor for a turbine which ensures optimum mixing of ambient inlet air and heated air extracted from the compressor, affords a uniform compressor inlet temperature profile across the inlet duct without substantial increase in the inlet pressure drop and which system is robust and structurally sound, accommodates thermal gradients and operates with improved reliability, predictability and is virtually maintenance-free.

BRIEF DESCRIPTION OF THE DRAWINGS

FIG. 5 is an enlarged fragmentary cross-sectional view illustrating the relative locations of the heated air tubes and silencing baffles;

FIG. 6 is an enlarged fragmentary rear elevational view illustrating the heating tubes behind the baffles and the direction of air flow;

FIG. 7 is an enlarged cross-sectional view illustrating a structural support for the entry of the tube into the inlet duct;

BEST MODE FOR CARRYING OUT THE INVENTION

Figure 1:
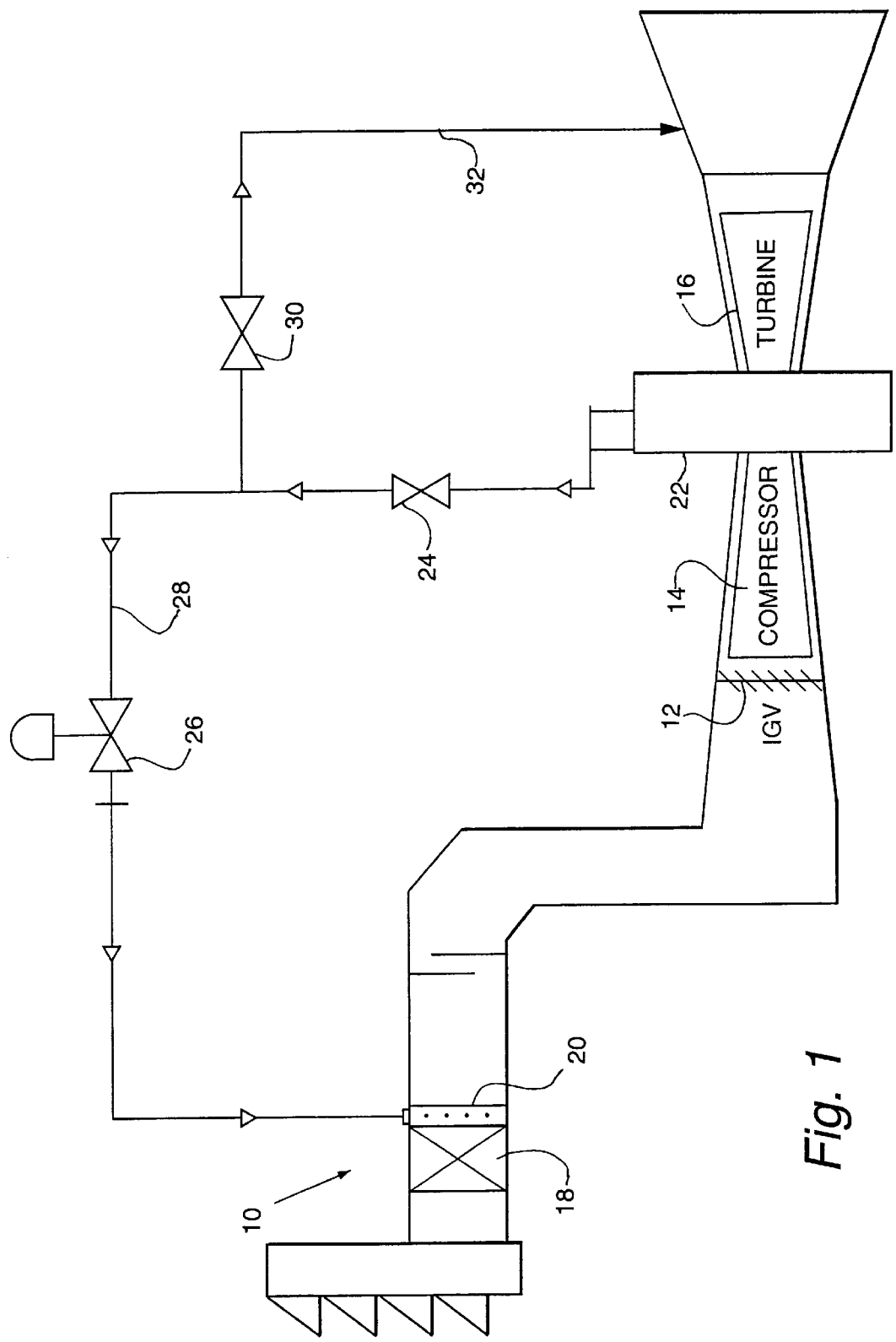
FIG. 1 is a schematic representation of a high pressure inlet bleed heat system according to the present invention.

Referring now to the drawing figures, particularly to FIG. 1, there is illustrated an inlet duct, generally designated 10, for receiving ambient air and directing the air to the inlet guide vanes 12 for the compressor 14 of a turbine 16. Silencing baffles 18 are disposed in the inlet duct 10 directly upstream of heater tubes 20 constructed and located in accordance with the present invention. The heater tubes 20 are provided with heated compressed air extracted from a compressor discharge manifold 22 via a line 28. A manual isolation valve 24 and a control valve 26 are provided in line 28. A drain valve 30 may be employed in line 28.

Figure 2:
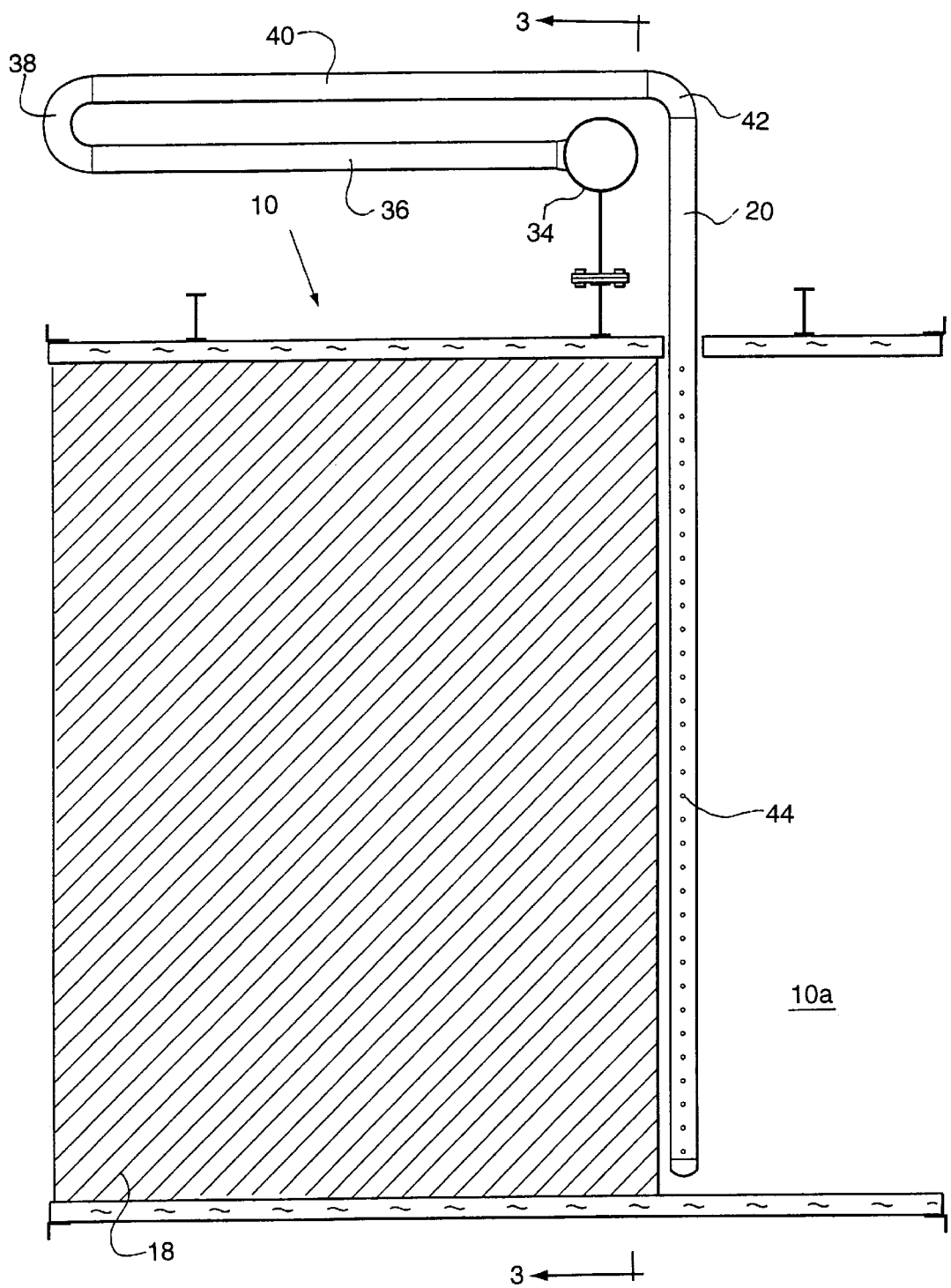
FIG. 2 is an enlarged fragmentary schematic illustration of the compressor air inlet duct of FIG. 1 illustrating one tube of a multi-tube heating system downstream of a silencer baffle.
Figure 3:
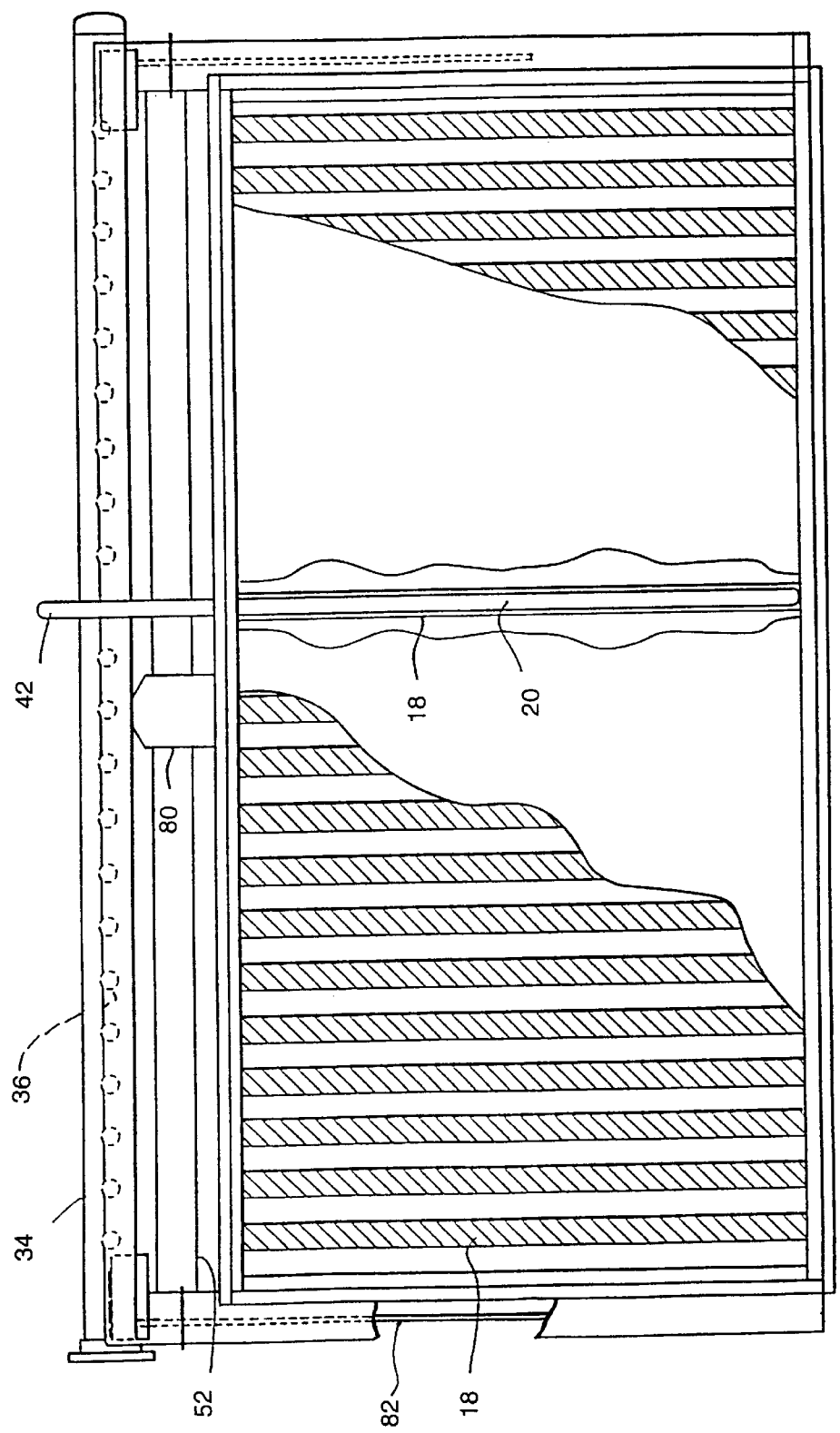
FIG. 3 is a cross-sectional view taken generally about on lines 3—3 in FIG. 2.
Figure 4:
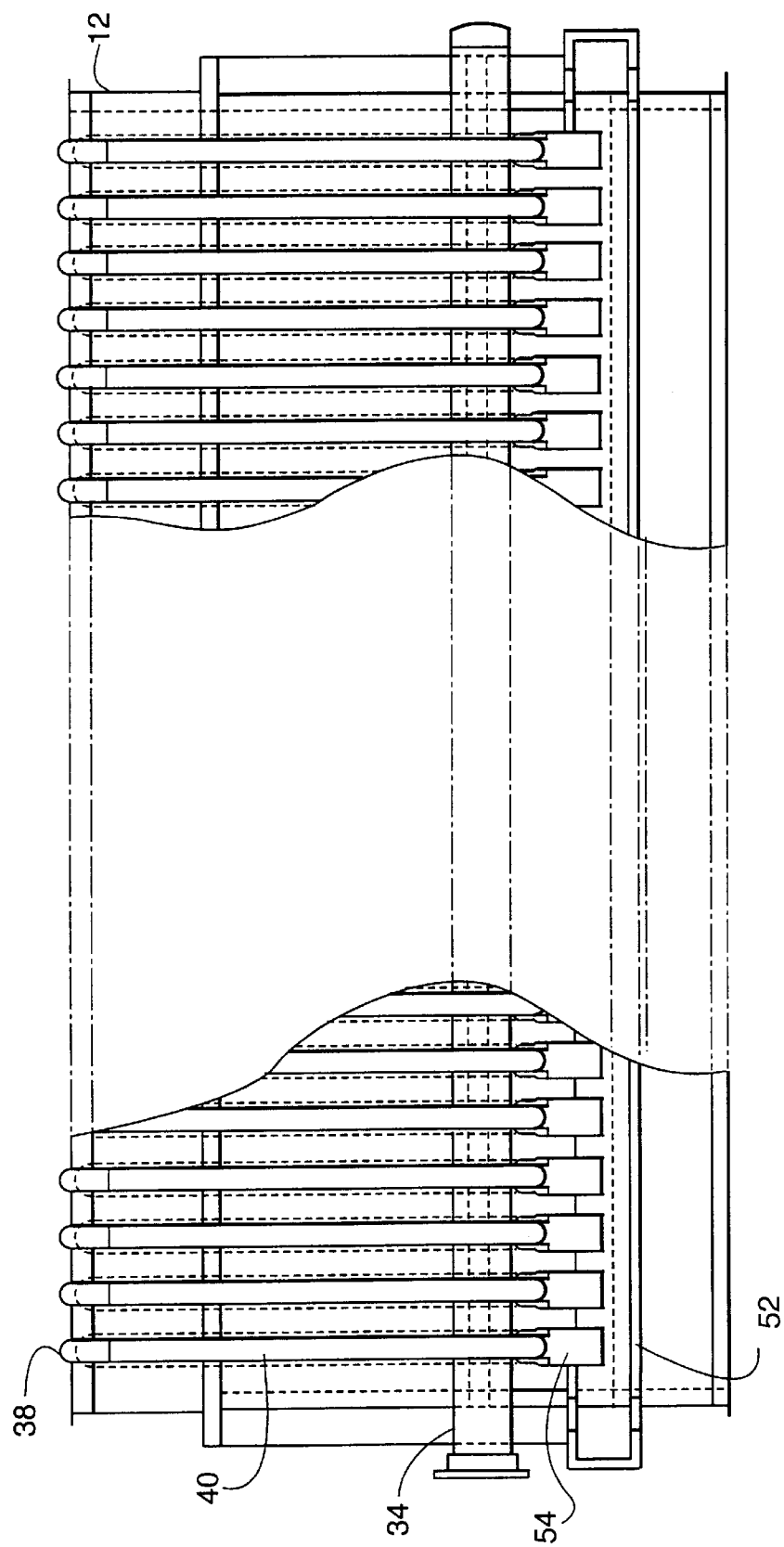
FIG. 4 is a top plan view of the system illustrated in FIG. 2.

Referring to FIGS. 2 and 3, inlet duct 10 has preferably a generally rectilinear cross-section, as best illustrated in FIG. 3. The silencing baffles 18 comprise a plurality of baffles, preferably standing on end in a vertical direction and in spaced side-by-side relation to one another. Consequently, ambient inlet air passes between the baffles for flow downstream to the compressor 14. As somewhat schematically illustrated in FIGS. 2 and 3, the heated compressed air is provided via line 28 to an inlet bleed heat manifold 34. In the illustrated preferred form, the manifold 34 comprises an elongated cylindrical header which extends transversely and externally relative to the inlet duct 10. A plurality of tubes 20 are connected at spaced intervals along the forward side of header 34. For reasons which will become apparent, each tube 20 has a forwardly extending, generally horizontal portion 36, a reverse bend 38, a rearwardly extending portion 40 and a downward 90° bend 42 whereupon the tubes 20 extend vertically downwardly and into the inlet duct 10. As illustrated, the tubes 20 are uniformly spaced transversely relative to one another and are disposed in the inlet duct 10 downstream of the downstream edges of the silencer baffles 18. Preferably, the outside diameter of the tubes 20 is less than the thicknesses of the silencer baffles upstream of the tubes 20 as illustrated in the central portion of FIG. 3 and in FIGS. 5 and 6.

As illustrated in FIGS. 2, 5 and 6, each of the tubes 20 within the inlet duct has a plurality of laterally opening apertures 44. The apertures are sized to provide choked flow of heated compressed air into the inlet duct 10. The apertures open through opposite lateral sides of each tube and the apertures of each tube are laterally aligned and in registration with the apertures of a next-adjacent tube. By locating the tubes directly downstream of the silencer baffles 18 and in a position to jet heated compressed air laterally toward one another, improved mixing of the heated air and the inlet air to the duct without substantial pressure loss is achieved. It will be appreciated that as the inlet air passes the trailing edges of the silencer baffle 18, trailing vortices are formed. With the apertures of adjacent tubes in registration with one another as indicated above, the jets of heated compressed air interact with one another and with the vortices to thoroughly mix the heated air with the inlet air across the entire width and height of the inlet duct 10. The duct 10 includes a section 10a directly downstream of the tubes, which is otherwise unobstructed, to provide a mixing zone for the ambient and heated air. Thus, a uniform temperature distribution of inlet air to the compressor without substantial duct pressure loss is provided.

Figure 8:
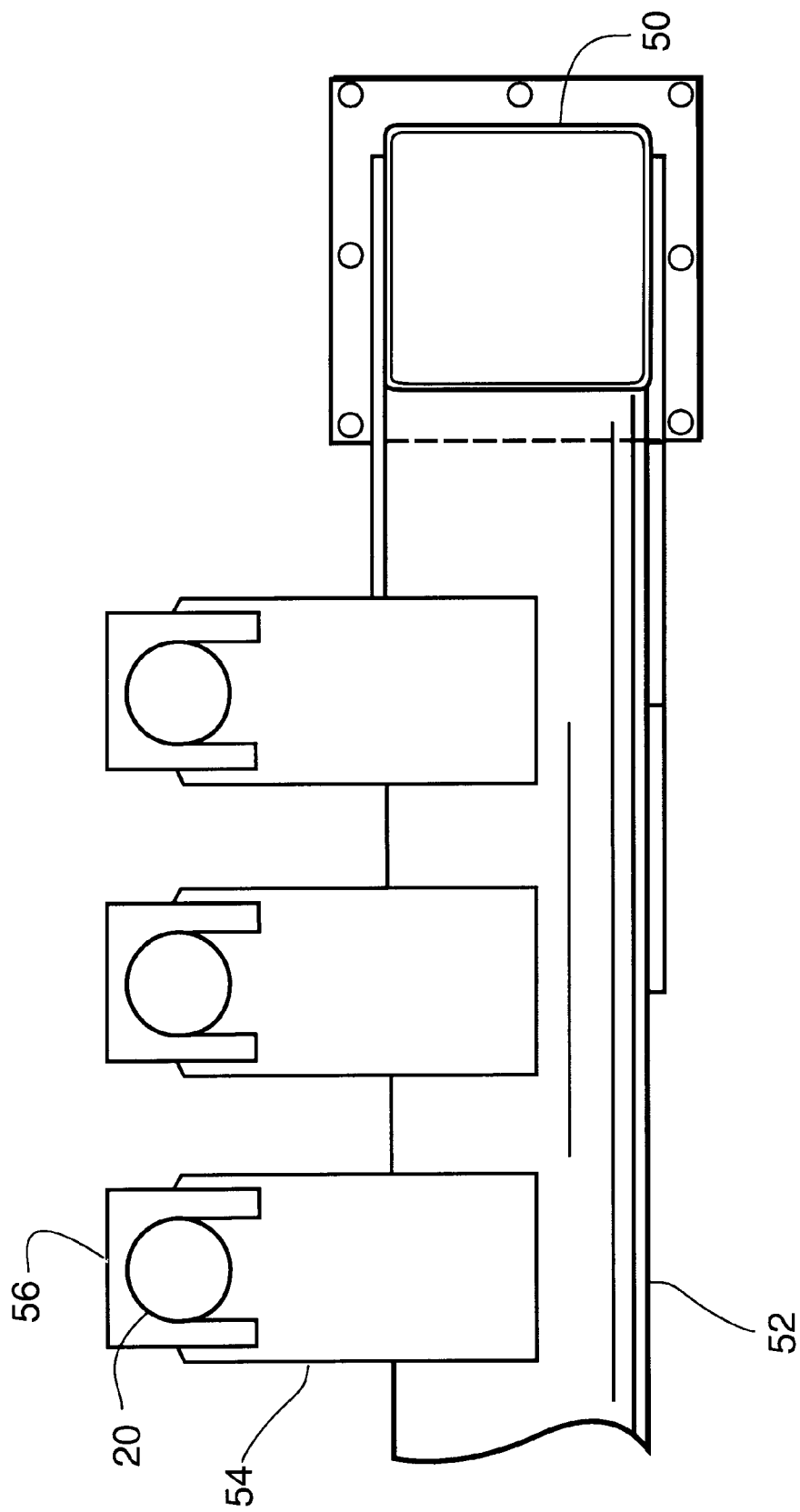
FIG. 8 is a fragmentary top plan view thereof.

Referring now to FIGS. 7–10, certain constructional features which contribute to the robust and structural nature of the bleed system hereof are illustrated. In FIGS. 7 and 8, there is illustrated a structural support for the tubes which permits thermal longitudinal expansion and contraction of the vertical portions of the tubes extending into the inlet is duct, while restraining the tubes from lateral movement. To accomplish this, a pair of stanchions 50 upstanding along opposite sides of the inlet duct carry a crossbeam 52 slightly behind the vertical portions of the tubes 20. A support plate 54 is provided for each tube and is secured at one end to the crossbeam 52 to project in an upstream direction toward tubes 20. The upstream end of each support plate 54 is shaped to receive the semi-circular cross-section of the tube. A retaining plate 56 having a semi-circular cutout is secured to the end of the support plate 54. Plates 54 and 56 therefore restrain the tubes 20 from lateral movement. However, the tubes 20 are free for vertical movement relative to the plates.

Figure 9:
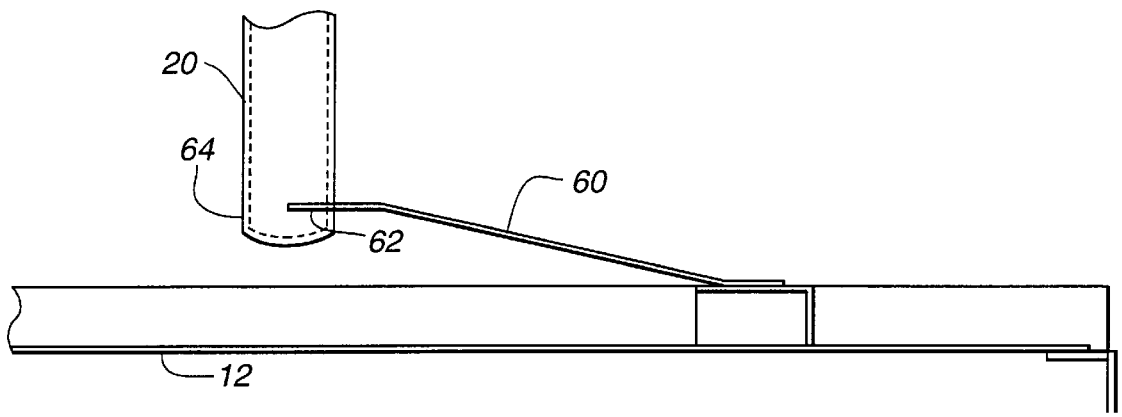
FIG. 9 is a fragmentary side elevational view of a structural connection at the lower end of a tube in the inlet duct.

As illustrated in FIG. 9, the ends of the tubes at the lower portions of the inlet duct 12 are spaced from the lower duct wall and are similarly supported to enable vertical lengthwise relative movement for accommodating thermal expansion, while lateral movement is restrained. Referring to FIG. 9, the lower ends of each tube 20 is supported against lateral movement by a plate 60 secured at one end to the duct wall. The opposite end of the plate 60 extends within a slot 62 formed in an end cap 64 of each tube 20 and is secured thereto. Consequently, the free ends of the tubes are restrained from lateral movement, while the flexible or spring-like nature of the plates 60 permit axial expansion and contraction of the tubes, accommodating thermal expansion.

Figure 10:
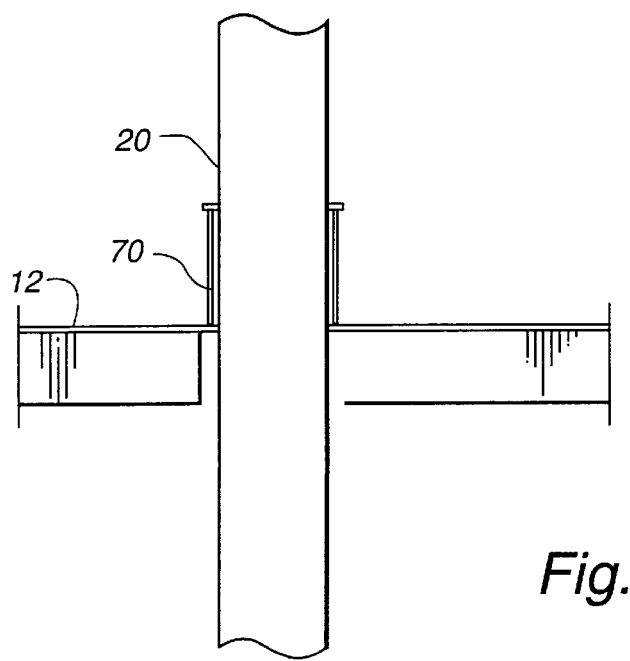
FIG. 10 is an enlarged view of the tube at its entry into the inlet duct.

In FIG. 10, the juncture of the tubes 20 and the top of the inlet duct is illustrated. To accommodate not only axial thermal expansion and contraction of the tubes but also expansion and contraction in a radial direction, a sleeve 70 larger in diameter than the diameter of the tube 20 is secured to the top of the inlet duct. Tube 20 is received in sleeve 70 and a plate 72 is secured to tube 20 to overlie the upper end of the sleeve.

Referring back to FIG. 3, the header 34 is subject to thermal expansion and contraction in an axial direction. To accommodate the movement of the header, the header is structurally supported intermediate its length, preferably medially, by a bracket 80 secured to a support structure. The opposite ends of the manifold are supported against vertical movement by rods 82 which are welded at their lower ends to the support structure and at their upper ends to the ends of the header 34. When the header expands axially due to thermal expansion, the rods 82 deflect, permitting lateral movement of the manifold ends while maintaining support for the manifold.

Additionally, and referring to FIG. 2, because of the various bends 38 and 42 in tubes 20, the tubes are sufficiently flexible to accommodate the lateral thermal expansion and contraction of the header 34 without stressing the tubes. Also, the thermal expansion and contraction of the tubes 20 per se is likewise accommodated by the flexible movement of the bent tubes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An inlet bleed heat system for the compressor of a turbine, comprising:

an air inlet duct for delivering ambient air along a flow path to the compressor;

a plurality of tubes, generally parallel to one another in the flow path of said air inlet duct and distributed substantially uniformly in said inlet duct, said tubes adapted for receiving heated extraction air from the compressor;

each said tube including a plurality of apertures spaced from one another along opposite sides of said tube for discharging the heated air from the tubes into the flow path, said apertures being arranged along next-adjacent tubes for discharging the heated air in directions toward one another to promote mixing of the discharged heated air with the ambient inlet air passing between the tubes to supply air to the compressor having a substantially uniform temperature distribution across the duct.

2. A system according to claim 1 wherein said apertures of next-adjacent tubes lies in registration with one another.

3. A system according to claim 2 wherein the heated air passing through the registering apertures flows in a direction generally perpendicular to the air flow path through the inlet duct.

4. A system according to claim 1 including a plurality of generally planar silencing baffles disposed in said inlet duct upstream of said tubes and lying in generally parallel spaced relation to one another and parallel to the direction of the flow of air along the flow path, said tubes being disposed downstream of respective baffles with the apertures directed to discharge the heated air into the ambient air flow exiting between the baffles.

5. A system according to claim 4 wherein each tube extends parallel to a plane containing a baffle and along a downstream edge of the baffle.

6. A system according to claim 5 wherein the outside diameter of each tube is less than the thickness of the baffle.

7. A system according to claim 1 wherein said tubes lie in fluid communication with a header external to said inlet duct, said tubes being connected to said header and constrained from movement within said duct in directions substantially normal to the axes of said tubes while enabling axial expansion and contraction of said tubes within the duct responsive to the flow of heated air through the tubes.

8. A system according to claim 7 wherein said tubes extend from said header through a plurality of bends thereof prior to entry into said inlet duct to accommodate thermal expansion and contraction of the header.

9. A system according to claim 1 including a header for receiving the heated extraction air from the compressor, said tubes being connected to said header for flowing the heated air from the header through the tubes and apertures into the flow path, said header being substantially rigidly carried by support structure connected to said header along an intermediate portion with opposite ends of the header being relatively free for thermal expansion and contraction, relative to said intermediate portions, supports at opposite ends of said header for supporting said header at said opposite ends without substantially laterally restraining said header from movement caused by thermal expansion and contraction of the opposite ends of the header.

10. An inlet bleed heat system for the compressor of a turbine, comprising:

an air inlet duct for delivering air along a flow path to the compressor;

a plurality of tubes, generally parallel to one another in the flow path of said air inlet duct and distributed substantially uniformly in said inlet duct;

a header external to said flow path;

said header adapted for receiving heated extraction air from the compressor, said tubes being connected to said header;

each said tube including a plurality of apertures spaced from one another along said tube for flowing the heated air from the tubes into the flow path for mixing with the inlet air passing between the tubes thereby affording a substantially uniform temperature distribution of air supplied to the compressor, said tubes being connected to said header and said inlet duct and constrained from movement within said inlet duct in directions substantially normal to the axes of said tubes while accommodating axial expansion and contraction of said tubes within the inlet duct responsive to the flow of heated air through the tubes; and a plurality of generally planar silencing baffles disposed in said inlet duct upstream of said tubes and lying in generally parallel spaced relation to one another and parallel to the direction of the flow of air along the flow path, said tubes being disposed downstream of respective baffles with the apertures directed to flow the heated air into the inlet air flow exiting between the baffles.

11. A system according to claim 10 wherein each tube extends parallel to a plane containing a baffle and along a downstream edge of the baffle.

12. A system according to claim 11 wherein the outside diameter of each tube is less than the thickness of the baffle.

13. An inlet bleed heat system for the compressor of a turbine, comprising:

an air inlet duct for delivering air along a flow path to the compressor;

a plurality of tubes, generally parallel to one another in the flow path of said air inlet duct and distributed substantially uniformly to said inlet duct;

an elongated header for receiving heated extraction air from the compressor, said tubes being connected to said header for flowing the heated air from the header into the tubes;

each said tube including a plurality of apertures spaced from one another along said tube for flowing the heated air from the tubes into the flow path for mixing with the inlet air passing between the tubes thereby affording a substantially uniform temperature distribution of air supplied to the compressor, said header being substantially rigidly carried by support structure connected to said header along an intermediate portion thereof enabling thermal expansion and contraction of opposite ends of the header relative to said intermediate header portion, and supports at opposite ends of said header for supporting said header at said opposite ends without imposing substantial lateral restraint on said header.

14. A system according to claim 13 including a plurality of generally planar silencing baffles disposed in said inlet upstream of said tubes and lying generally parallel to one another and to the direction of the flow of air along the flow path enabling flow of air along the flow path between the baffles, said tubes being disposed downstream of respective baffles with the apertures directed to flow the heated air into the inlet air flow exiting between the baffles.

15. A system according to claim 14 wherein each tube extends parallel to a plane containing a baffle and along a downstream edge of the baffle.

16. A system according to claim 15 wherein the outside diameter of each tube is less than the thickness of the baffle.

17. A system according to claim 13 wherein said tubes extend from said header through a plurality of bends thereof prior to entry into said inlet to accommodate thermal expansion of the header.

18. An inlet bleed heat system for the compressor of a turbine, comprising:

an air inlet duct for delivering air along a flow path to the compressor;

a plurality of tubes, generally parallel to one another in the flow path of said air inlet duct and distributed substantially uniformly in said inlet duct;

a header external to said flow path, said header adapted for receiving heated extraction air from the compressor, said tubes being connected to said header;

each said tube including a plurality of apertures spaced from one another along said tube for flowing the heated air from the tubes into the flow path for mixing with the inlet air passing between the tubes thereby affording a substantially uniform temperature distribution of air supplied to the compressor, said tubes being connected to said header and said inlet duct and constrained from movement within said inlet duct in directions substantially normal to the axes of said tubes while accommodating axial expansion and contraction of said tubes within the inlet duct responsive to the flow of heated air through the tubes, said tubes extending from said header through a plurality of bends thereof prior to entry into said inlet to accommodate thermal expansion of the header.

19. An inlet bleed heat system for the compressor of a turbine, comprising:

an air inlet duct for delivering air along a flow path to the compressor;

a plurality of tubes, generally parallel to one another in the flow path of said air inlet duct and distributed substantially uniformly in said inlet duct;

a header external to said flow path;

said header adapted for receiving heated extraction air from the compressor, said tubes being connected to said header;

each said tube including a plurality of apertures spaced from one another along said tube for flowing the heated air from the tubes into the flow path for mixing with the inlet air passing between the tubes thereby affording a substantially uniform temperature distribution of air supplied to the compressor, said tubes being connected to said header and said inlet duct and constrained from movement within said inlet duct in directions substantially normal to the axes of said tubes while accommodating axial expansion and contraction of said tubes within the inlet duct responsive to the flow of heated air through the tubes, said header being elongated and substantially rigidly carried by support structure connected to said header along an intermediate portion thereof enabling thermal expansion and contraction of ends of the header relative to said intermediate header portion, and supports at opposite ends of said header for supporting said header at said opposite ends without imposing substantial lateral restraint on said header.

* * * * *